United States Patent [19]

Lauritsen

[11] Patent Number: 5,337,544
[45] Date of Patent: Aug. 16, 1994

[54] MOWER CONDITIONER

[75] Inventor: Georg Lauritsen, Kerteminde, Denmark

[73] Assignee: Maskinfabriken Taarup A/S, Kerteminde, Denmark

[21] Appl. No.: 916,997

[22] PCT Filed: Feb. 1, 1991

[86] PCT No.: PCT/DK91/00029
  § 371 Date: Sep. 1, 1992
  § 102(e) Date: Sep. 1, 1992

[87] PCT Pub. No.: WO91/11099
  PCT Pub. Date: Aug. 8, 1991

[30] Foreign Application Priority Data
  Feb. 1, 1990 [DK] Denmark .................. 0267/90

[51] Int. Cl.⁵ ................................. A01D 34/66
[52] U.S. Cl. ......................... 56/15.7; 56/6; 56/DIG. 3; 56/DIG. 14
[58] Field of Search ............ 56/15.7, 15.9, 16.4 B, 56/16.4 C, 6, DIG. 3, DIG. 10, DIG. 9, DIG. 14, 16.4, 16.4 A

[56] References Cited

U.S. PATENT DOCUMENTS

| | | | |
|---|---|---|---|
| 4,177,625 | 12/1979 | Knight et al. | 56/13.6 |
| 4,719,742 | 1/1988 | Ermacora et al. | 56/16.4 |
| 4,843,804 | 7/1989 | Wellman | 56/16.4 C |
| 5,060,462 | 10/1991 | Helfer et al. | 56/DIG. 10 X |
| 5,107,663 | 4/1992 | Wattron et al. | 56/DIG. 10 X |

FOREIGN PATENT DOCUMENTS 0338649 10/1989 European Pat. Off. .
510975 9/1971 Switzerland .

*Primary Examiner*—Terry Lee Melius
*Attorney, Agent, or Firm*—Jacobson, Price, Holman & Stern

[57] ABSTRACT

A mowing machine has a frame with driving wheels, which are adjustable in height, and a yoke carrying a cutter beam. The yoke is suspended from the frame such that it can move up and down with respect to the frame, and the cutter beam is swingably journalled on the yoke. The yoke and the beam are balanced by an upwardly directed spring force. Minor elevations on the ground make the cutter beam swing upwardly so that it is just the weight of the cutter beam itself which is accelerated.

2 Claims, 2 Drawing Sheets

MOWER CONDITIONER

BACKGROUND OF THE INVENTION

Mowing involves driving at a very high speed, and a short stubble length is generally desired. Since the field is irregular, the cutter beam is subjected to rapid vertical movements with respect to the wheels. The machine is balanced with springs so that the cutter beam just rests on the ground with a moderate pressure. Owing to the relatively great weight of the machine and the resulting inertia, the machine, in spite of good balancing, will be subjected to very strong shock impacts on the cutter beam with the problems this entails.

CH-510 975 discloses a mower conditioner whose cutter beam is suspended from two long carrier arms, which are swingably connected with the frame of the mower conditioner by means of partly a hinge and partly a ball link. The cutter beam is rigidly secured to the hinged carrier arm and rotatably connected with the other by means of a ball link. This structure reduces the mass to be accelerated when the cutter beam meets irregularities.

SUMMARY OF THE INVENTION

The invention concerns a mowing machine the object of which is to additionally reduce the shock impacts to which the cutter beam is subjected when driving on an irregular field, while improving the ground following ability of the cutter beam.

This object is achieved in that the mowing machine is constructed so that the cutter beam can pivot freely upwardly when hitting an elevation, so that it is just the weight of the beam itself which is accelerated. The shore distance between the center of gravity of the cutter beam and the hinge axis entails that the movements of the beam caused by irregularities will be more in the nature of tilting movements than distinct lifting movements which take place when long carrier arms are used, thereby reducing the average lifting height.

The movements of the cutter beam with respect to the carrier means may be limited in both directions. If an irregularity is so high that the beam pivots to stop, the upwardly directed spring force on the carrier means will have begun raising, this owing to the smaller load.

Because of the free downward movement of the cutter beam the machine can work with less ground pressure than known machines. Not only the machine itself, but also plants in the field will benefit from the reduction in the shock impacts.

BRIEF DESCRIPTION OF THE DRAWINGS

Two embodiments of the mowing machine of the invention are shown schematically in vertical section in FIGS. 1 and 2, respectively, of the drawings, and will be described more fully below with reference to these figures.

DETAILED DESCRIPTION OF THE PREFERRED EMBODIMENTS

Figure 1:
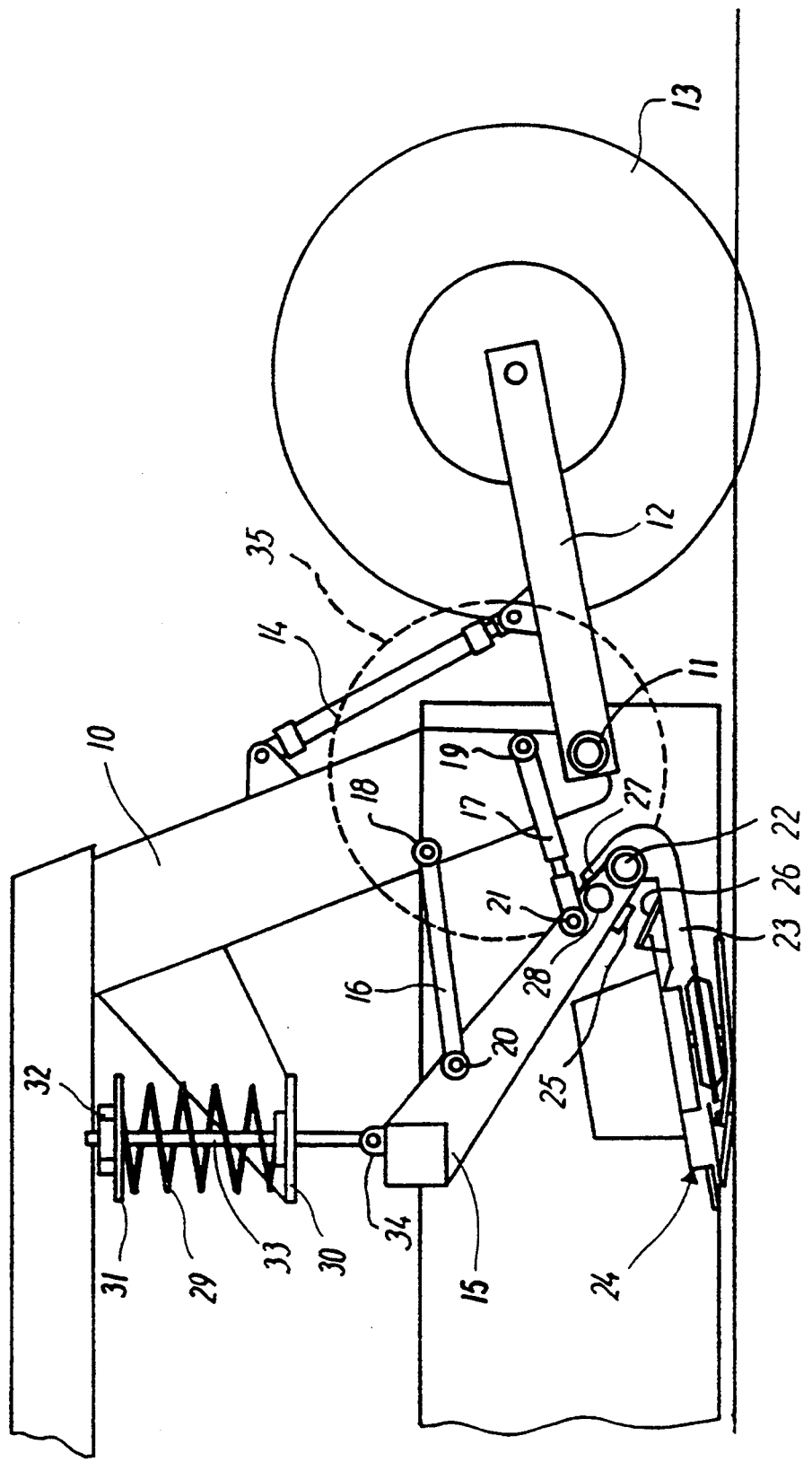

In FIG. 1, 10 is a frame to which wheel arms 12, carrying wheels 13, are swingably secured via pivots 11. Hydraulic cylinders 14 are provided between the main frame and the wheel arms, making it possible to adjust the height of the main frame above the ground. A yoke 15 is movably suspended from the frame 10 by means of two link rods 16 and 17 at each end. These link rods are swingably connected with the frame and the yoke, respectively, by means of pivots 18, 19, 20 and 21, and together form parallelograms making it possible for the yoke to move upwardly and downwardly with respect to the frame.

A cutter beam 23 is swingably secured to the lower part of the yoke 15 by means of hinges 22, said cutter beam carrying a plurality of the disc assemblies which are provided with knives and are generally designated 24. Stop means 25 and 26 on the yoke and the cutter beam, respectively, restrict the movement of the latter in an upward direction, and a stop arm 27 on the cutter beam cooperates with an adjustable stop means 28 on the yoke to restrict the movement of the beam in a downward direction and to determine the cutting angle.

The yoke 15 and the cutter beam 23 suspended from it are balanced by means of compression screw springs 29, whose one end rests on a flange 30 firmly connected with the frame 10, and whose other end engages a disc 31, which is pressed by the spring against a nut 32 on the threaded outer end of a rod 33, which is rotatably journalled at the lower end in an ear 34 on the yoke. The nut 32 makes it possible to adjust the spring tension.

A wing wheel 35, throwing the harvested material rearwardly between the wheels, is rotatably journalled in a generally known manner in the frame 10, as shown in broken line.

Minor elevations on the ground make the cutter beam 23 pivot upwardly about the hinges 22, without the yoke moving noticeably. Only when an elevation is so large that the stop means 26 of the beam abuts the stop means 25 on the yoke, will this too be lifted.

Figure 2:
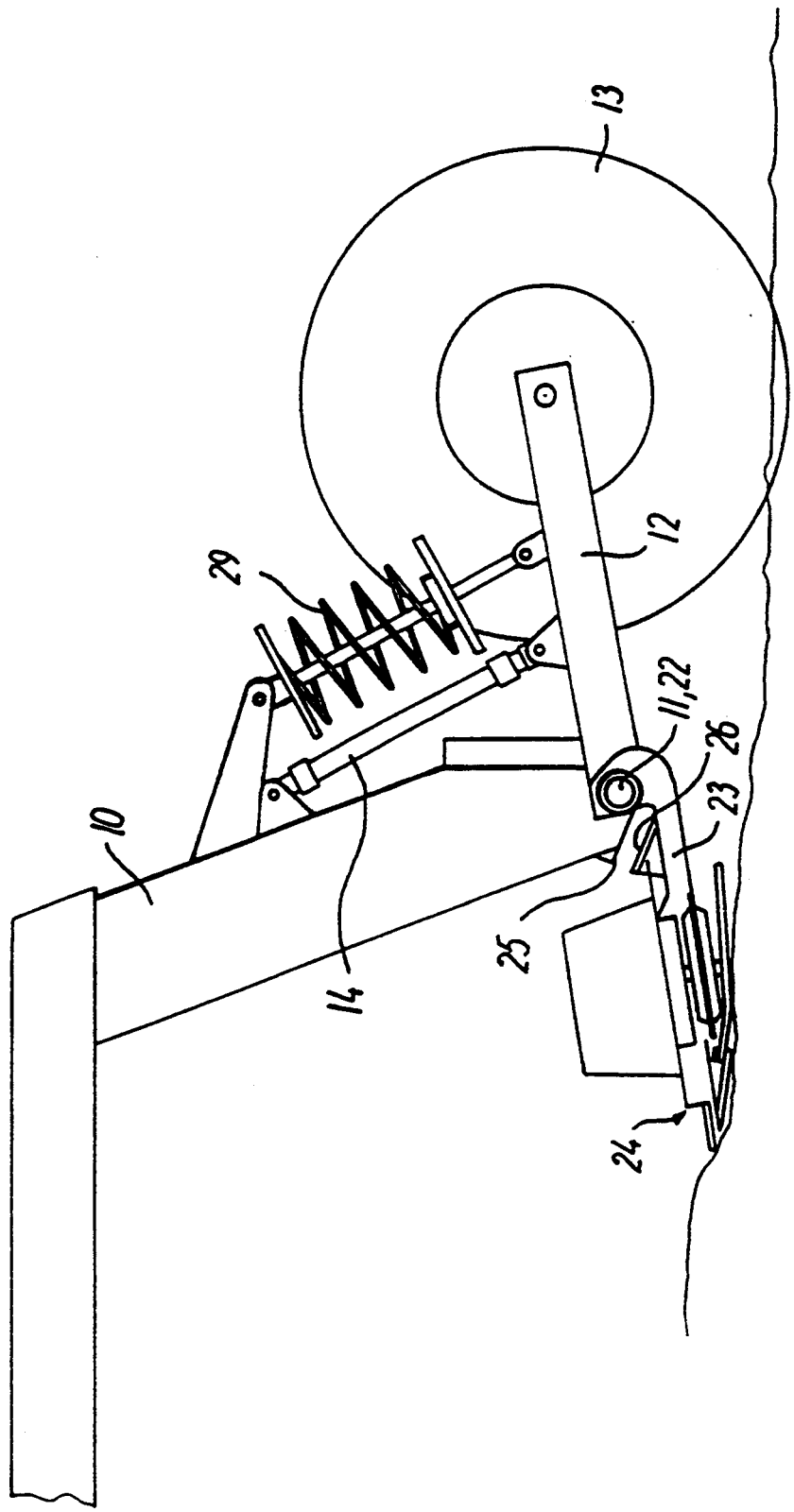

The same reference numerals are used in FIG. 2 as in FIG. 1 for corresponding parts. In the structure shown in FIG. 2, the cutter beam 23 is hinged directly to the frame 10, and this hinging is performed by means of the same pivots 11 as those on which the wheel arms 12 are journalled. The compression screw springs 29 are here arranged between the wheel arms and a part firmly connected with the frame 10. In this structure, it is the entire frame which is lifted when the stop means 26 on the cutter beam abuts the stop means 25, which is here arranged on the frame.

The constructive details in the mowing machine shown and described may be modified in several ways within the scope of the invention.

I claim:

1. A mowing machine comprising:
   a cutter beam
   a frame,
   a yoke adjustable in height, mounted on said frame and carrying said cutter beam,
   said yoke being at least partly and resiliently supported with respect to said frame by a spring,
   ends of said cutter beam being hinged to said yoke so as to be freely swingable about a horizontal axis with respect to said yoke, said horizontal axis being positioned adjacent a rearward edge of said cutter beam.

2. A mowing machine according to claim 1, wherein said yoke has adjustable abutments forming stop means for determining end positions of said cutter beam with respect to said frame for initially pivoting of only said cutter beam until said stop means is engaged.

* * * * *